July 17, 1962

A. GIOVINAZZO 3,044,812

CABLE ANCHOR CLEVIS

Filed Aug. 30, 1960

INVENTOR.
ANTHONY (NMI) GIOVINAZZO

BY

*M. Hoyt Young*
ATTORNEYS

July 17, 1962

A. GIOVINAZZO 3,044,812

CABLE ANCHOR CLEVIS

Filed Aug. 30, 1960

INVENTOR.
ANTHONY (NMI) GIOVINAZZO
BY
*N. Hoyt Young*
ATTORNEYS

United States Patent Office 3,044,812
Patented July 17, 1962

3,044,812
CABLE ANCHOR CLEVIS
Anthony Giovinazzo, 4555 Landis St., San Diego, Calif.
Filed Aug. 30, 1960, Ser. No. 53,013
2 Claims. (Cl. 287—91)
(Granted under Title 35, U.S. Code (1952), sec. 266)

The invention described herein may be manufactured and used by or for the Government of the United States of America for governmental purposes without the payment of any royalties thereon or therefor.

This invention relates to anchoring devices for downhaul cables employed in submarine rescue operations. More specifically, it refers to a special type of clevis attached to the bail on a submarine escape hatch. Said clevis was designed to facilitate divers in replacing a broken downhaul cable underwater with a new one, during an emergency.

In the past different types of submarine rescue hatch bails were used on various models. In the particular type bail a clevis is fastened to the anchor end of the downhaul cable and attached to the bail by means of the clevis pin. In the past, when the downhaul cable has parted, a clevis body is metallic spliced onto the new cable and attached to the bail by the clevis pin. In the present invention a plug, readily attached to the downhaul cable, is merely assembled into the new clevis body to provide a replacement anchor.

The general object of this invention is to provide means for readily anchoring a replacement downhaul cable to a submarine emergency escape hatch during rescue operations.

Another object is to provide a new clevis design for readily attaching to cables carrying plugs fixed to the cable at its anchor end.

With these and other objects in view, as will hereinafter more fully appear, and which will be more particularly pointed out in the appended claims, reference is now made to the following description when read in connection with the accompanying drawings in which:

Figure 1:
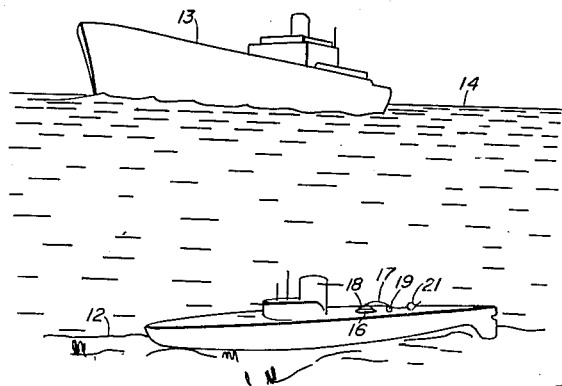
FIG. 1 illustrates a rescue ship arriving at a sunken submarine.
Figure 2:
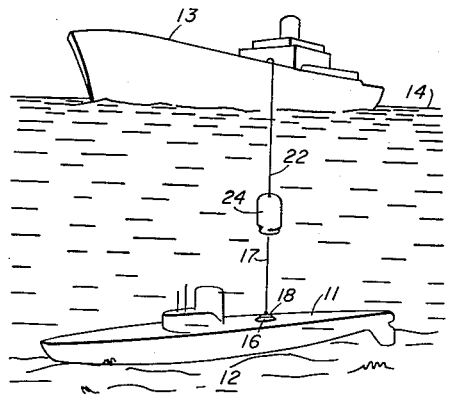
FIG. 2 shows a rescue bell being hauled down to the submarine rescue hatch.

In detail, FIG. 1 illustrates a submarine resting on the ocean bottom 12 while the rescue ship 13 has heaved to on the surface 14 above the submarine 11. On the deck of the submarine 11 a downhaul cable 17 is wound on a reel or cable spool 19 and anchored to the bail 18 of escape hatch 16. A float 21 attached to the reel 19, may be released by the submarine crew in case of an emergency and thereby float the reel to the ocean surface where it can be picked up by the rescue vessel 13 and attached to the rescue bell or chamber 24 carried by the rescue ship.

Figure 3:
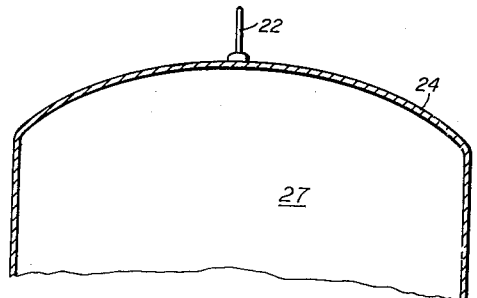
FIG. 3 is a cross section showing the submarine rescue bell.

The bell 24 remains connected to the rescue ship by safety line 22 which is payed out as the hauldown cable 17, anchored to bail 18 of the escape hatch 16 is reeled in by the operator in compartment 27 in the rescue chamber 24, FIG. 3. The cable 17 is wound in by reel 29 which is manually operated inside the bell 24 through the hand wheel 31 and drive 32 until the sealing pad 23 is snugly pressed against the matching surface 26 of the submarine escape hatch 16 to provide a water tight joint. Passage between the submarine and escape compartment of the rescue bell is made possible by opening the hatches 16 and 28 after the bell 24 is secure.

In case the downhaul cable 17 or the clevis 34 is broken, it is necessary for a diver to go down and attach a new cable to the bail 18. To facilitate replacing a downhaul cable a special type of clevis has been provided as illustrated in FIGS. 4 and 5.

In emergency rescue operation the rescue ship is either equipped with extra downhaul cables 17 having plug 38 attached or means for fastening plug 38 to a broken cable. The special clevis is designed especially for facilitating the diver's job of anchoring the cable 17 and plug 38 on the bail 18.

Figure 5:
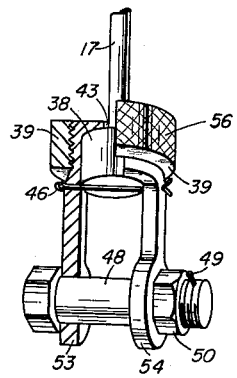
FIG. 5 is an assembly view of the clevis and cable partially in section.
Figure 4:
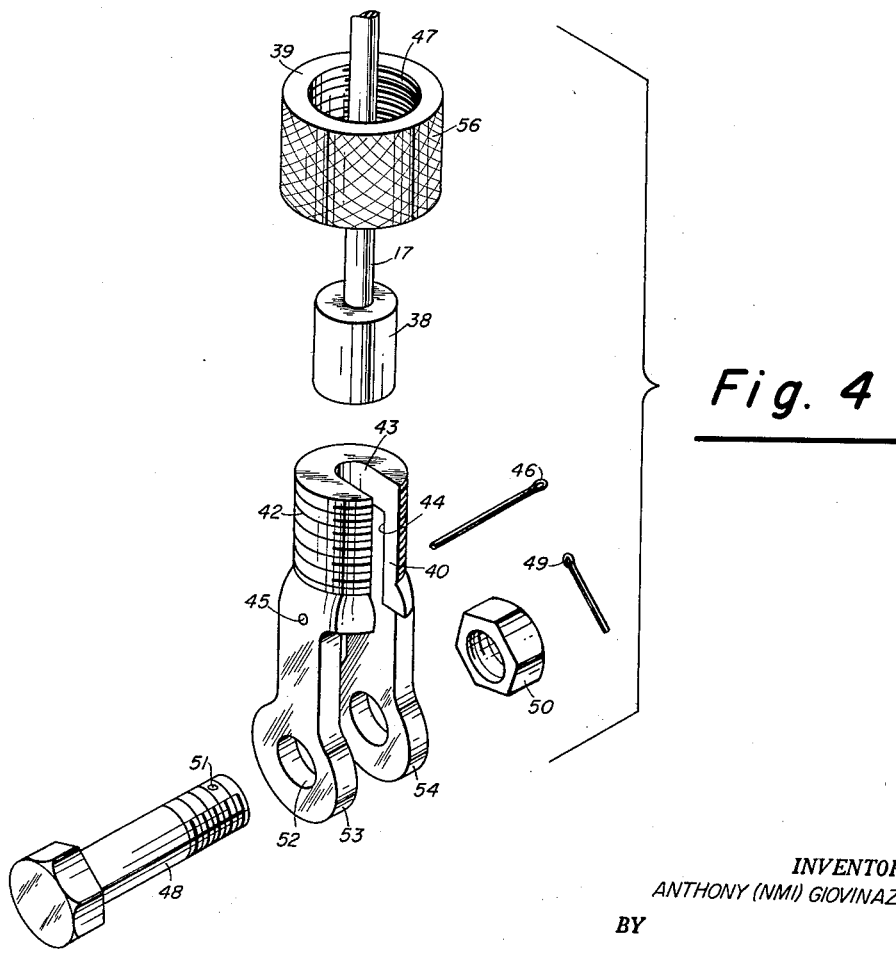
FIG. 4 is a blown up view showing the cable anchor clevis.

Said clevis, FIGS. 4 and 5, comprises the pintle arms 53 and 54 adapted to be pinned to the bail 18, and the body portion 40 to which the pintle arms are fixed. The pintle arms are bored 52 to receive the bolt or pintle 48 to attach the clevis to the bail 18 of the escape hatch 16. The bolt 48 is secured by nut 50 and cotter 49 through hole 51.

The body portion 40 is provided with an axial groove 43 employed as a cable slot for receiving the cable 17. The body 40 is also provided with an axial bore 44 for receiving the cable plug 38. The pintle arms 53 and 54 are separated a distance slightly greater than the diameter of plug 38 whereby the cable 17 and plug 38 assembly can be moved radially and then axially to position the plug 38 in said bore 44 and the cable in said slot 43. The collar 39 through which the cable and plug had been threaded beforehand is then assembled by the diver by screwing the female thread 47 onto the male thread 42 of the body portion thus securing the plug 38 in the clevis body. A cotter 46 is then inserted in hole 45 to prevent the plug 38 from dropping out of the bore 44 in case the cable slackens.

In case the cable 17 is broken and to be replaced by a diver in an emergency, the collar 39 can be backed off the body portion 40 by gripping the knurled surface 56 and unscrewing the threaded joint. After the collar is backed off, the cable 17 and plug 38 are moved radially out of the body 40. The collar 39 is then slipped over the replacement cable plug 38, onto the cable 17 and the cable and plug combination are assembled in the clevis body 40 as mentioned above.

It should be understood, of course, that the foregoing disclosure relates to only a preferred embodiment of the invention and that it is intended to cover all changes and modifications of the example of the invention herein chosen for the purpose of disclosure, which do not constitute departures from the spirit and scope of the invention.

What is claimed is:

1. In a cable anchor suitable for underwater assembly and positive attachment to a submarine escape hatch swinging bail bar having a downhaul cable attached to said cable anchor, a cylindrical plug attached to the outboard end of said cable, the improvement comprising an anchor clevis provided with pintle arms adapted to slide on said bail bar and adapted for positive attachment to said bail bar by a pintle bolt and nut so that said clevis will be automatically centered on said bail bar during downhaul operation regardless of ocean currents and deflection of an object attached to said bail bar said clevis comprising a body portion and pintle arms extending downward from opposite sides of said body portion, a longitudinal axial slot in said body portion running parallel with a plane located midway between said pintle arms, said slot extending radially inward from the surface of said body portion through the axis thereof, said slot having a width greater than said cable, said pintle arms being spaced apart a distance to permit said plug to pass therebetween, and an opening in the bottom of said body portion connected to said slot to receive said plug and cable so that the cable and plug may be readily assembled underwater in said clevis body and positively attached thereto.

2. In a cable anchor suitable for underwater assembly and positive attachment to a submarine escape hatch swinging bail bar having a downhaul cable attached to said cable anchor, a cylindrical plug attached to the outboard end of said cable, the improvement comprising an anchor clevis provided with pintle arms adapted to slide on said bail bar and adapted for positive attachment to said bail bar by a pintle bolt and nut so that said clevis will be automatically centered on said bail bar during downhaul operation regardless of ocean currents and deflection of an object attached to said bail bar said clevis comprising a body portion and pintle arms extending downward from opposite sides of said body portion, a longitudinal axial slot in said body portion running parallel with a plane located midway between said pintle arms, said slot extending radially inward from the surface of said body portion through the axis thereof, said slot having a width greater than said cable, said pintle arms being spaced apart a distance to permit said plug to pass therebetween, an opening in the bottom of said body portion connected to said slot to receive said plug and cable so that the cable and plug may be readily assembled underwater in said clevis body and positively attached thereto said body portion being provided with a male thread, and a collar provided with a female thread to match said male thread, said collar being large enough to slide over said cable and plug before their assembly in said body and then screwed into assembled position on said body so that said slotted body portion will be circumferentially supported against ocean current forces in all directions.

References Cited in the file of this patent
UNITED STATES PATENTS

| | | |
|---|---|---|
| 1,319,565 | Burney | Oct. 21, 1919 |
| 1,501,138 | Rounds | July 15, 1924 |
| 1,606,272 | Stump | Nov. 9, 1926 |
| 1,853,898 | Grieshaber | Apr. 12, 1932 |
| 1,929,168 | Grieshaber | Oct. 3, 1933 |
| 2,311,043 | Furey | Feb. 16, 1943 |
| 2,803,486 | Larson et al. | Aug. 20, 1957 |